J. W. JONES.
SPEEDOMETER.
APPLICATION FILED NOV. 5, 1907.
899,055.
Patented Sept. 22, 1908.
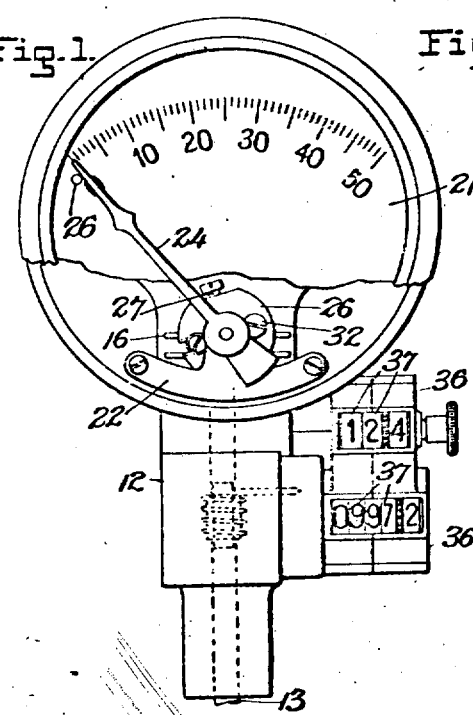
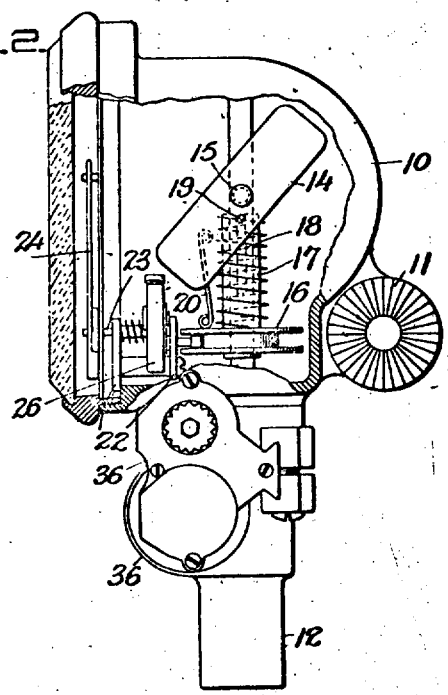
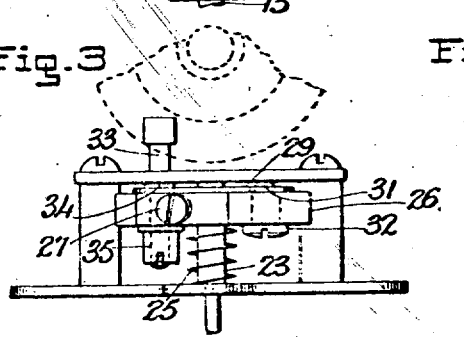
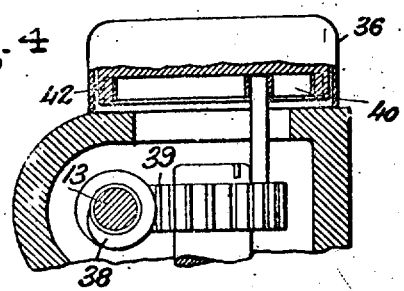
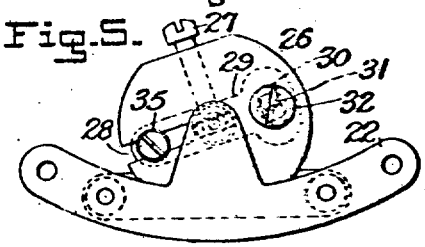
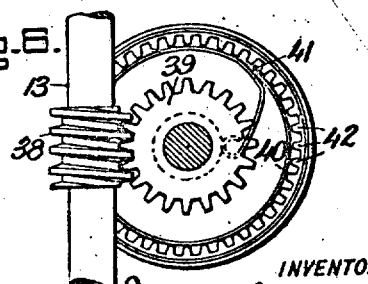
INVENTOR:
Joseph W. Jones
BY
Edmond Coyan Brown
ATTORNEY
WITNESSES

UNITED STATES PATENT OFFICE.

JOSEPH W. JONES, OF NEW YORK, N. Y.

SPEEDOMETER.

No. 899,055.

Specification of Letters Patent.

Patented Sept. 22, 1908.

Application filed November 5, 1907. Serial No. 400,787.

*To all whom it may concern:*

Be it known that I, JOSEPH W. JONES, a citizen of the United States, and a resident of the city and State of New York, have invented certain new and useful Improvements in Speedometers, of which the following is a specification.

My invention relates to devices for indicating and recording the speed of movement of machinery, more particularly automobiles and other vehicles, by means of indicating means operatively connected to the propelling engine or other moving part of the machinery the speed of which is to be measured or indicated, and the object of the invention is to provide an improved form of device for accomplishing the said purposes in a more efficient and advantageous manner than has heretofore been the case.

The invention consists of the novel construction, arrangement and combination of parts hereinafter particularly described and shown on the accompanying drawings.

In the said drawings, Figure 1 is a front view of the indicator, a portion of the face being broken away to show part of the interior construction; Fig. 2 is a side elevation with the casing so broken away as to show the interior; Fig. 3 is an enlarged detail plan view of the index shaft; Fig. 4 is an enlarged detail view of the record worm and worm wheel; Fig. 5 is a front view of the frame carrying the index shaft, showing its adjusting means; and Fig. 6 is a view of the worm and worm wheel which drives the record dials.

Referring now to the said drawings, it will be seen that the principal working parts of the indicator are inclosed within the casing 10, which is provided at its rear with a coupling 11 adapted to attach it to a bracket on an automobile or other object, this coupling being provided with serrations to engage with coöperating serrations on the bracket so that the casing 10 may be placed at any angle to permit the face plate to be conveniently inspected, and there secured.

The stem 12 of the casing is hollow and through same plays a shaft 13 to which motion may be imparted from the vehicle wheel or one of the moving parts of the engine by means of flexible shafting or other suitable means, not shown in the drawing but which will be readily understood. The upper part of the shaft 13 has loosely pivoted on it a weight 14 by means of the pivot screws 15, and when the shaft rotates centrifugal action causes the weight to assume a horizontal position or inclination, more or less according to the speed at which the shaft is moving.

Loosely mounted upon the shaft 13 is a grooved wheel 16, having a stem 17 in which is a slot 18 which permits the passage of a pin 19 projecting from the shaft, which permits the sleeve to move longitudinally along the shaft, at the same time causing it to rotate. This wheel 16 is connected with the weight 14 by means of a link 20. It will be readily seen that as the weight approaches toward the horizontal position, it carries the wheel 16 upward on the shaft.

At the front of the casing 10 is a dial face 21, provided with a line of numerals representing the speed in miles per hour which the automobile or other vehicle is traveling, and pivoted in brackets 22 at the front of the casing is a shaft 23 which carries an index 24 adapted to sweep over the dial face and the numerals. The shaft 23 carries a spring 25 which encircles it and which is attached to it by one end. The other end of the spring is secured to the bracket 22, the object of this spring being to return the index 24 to the zero mark on the dial where its movement rearward is limited by the pin 26. The shaft 23 also carries a disk 26, secured by the set screw 27 and having a slot 28 extending inward from one side (see Fig. 5.) On the rear side of this disk is carried a slide 29 straddling the shaft 23 and having at one end a slot 30 in which plays an eccentric stud 31 at the lower end of the adjusting screw 32. It will be seen that as this screw is turned, the stud 31 throws the slide one way or the other along the rear side of the plate. The other end of the slide 29 carries a rearwardly projecting pin 33 with a collar 34 and, is provided at its forward end with a nut 35, which, with the aid of the collar not only locks the pin to the disk but also secures the slide 29 at any point it is adjusted after being set by the screw 32.

The pin 33 extends far enough to the rear to enter the groove of the wheel 16 (see Fig. 2) and as this wheel rises on the shaft 13, the pin 33 is carried upward, swinging the disk 26 around on its shaft and causing the index to sweep over the numbered dial. The sweep of the index obviously depends upon the height to which the wheel 16 is carried by the centrifugal action of the weight 14 and this is regulated by the speed at which the shaft 13 is being driven. It will be seen that the extent of the sweep of the index corresponding to a given vertical motion of the wheel 16 may be varied to some extent by the adjustment of the slide 29 bearing the pin 33. As this pin is moved toward the center of the disk 26 the motion of the index relative to that of the wheel 16 is increased, and vice versa. The object of this part of the mechanism is to permit the adjustment and regulation of the apparatus as circumstances may require as for instance a variation in the elasticity of the spring 25.

At one side of the stem 12 are boxes 36 carrying commutation dials 37 which are operated by the worm 38 and worm wheel 39 (see Fig. 6,) the former being carried on the shaft 13 and the latter driving the dials by the medium of the spring connection 40, one end of which spring is connected with the worm wheel 39 while the other and free end 41 plays in the teeth 42 and turns the last commutator dial. When the series is completed the connection may turn onward without endangering the mechanism. The dials may also be set with this arrangement without the danger of disarrangement of the mechanism. The driving of these dials 37 is in the ordinary manner, and it is not thought necessary to give them further description or illustration.

It is obvious that the construction of the device need not be confined to the exact details shown, as it may be modified as desired without departing from the essential features above described and illustrated.

Having thus described my invention, what I claim as new and desire to secure by Letters Patent, is as follows:

1. In a speedometer, the combination with a shaft adapted to be driven by the mechanism or vehicle the speed of which is to be measured, of a device movable longitudinally on said shaft, means for imparting movement to said device proportionately to the speed of the shaft, means operated by said longitudinally-movable device for indicating the extent of its longitudinal movement and thereby the speed at which said mechanism or vehicle is being operated, and means intermediate the said longitudinally-movable device and the said indicating means adapted to adjustably operatively connect the same together; said indicating means comprising a shaft bearing an index or pointer; and said intermediate means comprising a slotted disk fast on said index shaft, a pin operatively connected with said disk in the slot thereof and also operatively connected with the said longitudinally-movable device on the driven shaft, and means adapted to move said pin in said slot toward or away from the index shaft.

2. In a speedometer, the combination with a shaft adapted to be driven by the mechanism or vehicle the speed of which is to be measured, of a device movable longitudinally on said shaft, means for imparting movement to said device proportionately to the speed of the shaft, means operated by said longitudinally-movable device for indicating the extent of its longitudinal movement and thereby the speed at which said mechanism or vehicle is being operated, and means intermediate the said longitudinally-movable device and the said indicating means adapted to adjustably operatively connect the same together; said indicating means comprising a shaft bearing an index or pointer; and said intermediate means comprising a radially slotted disk on said index shaft, a pin operatively connected with said disk in the slot thereof and also operatively connected with the said longitudinally-movable device on the driven shaft, a link adapted to move said pin in said slot radially toward or away from the index shaft, and an eccentric cam for operating said link.

3. In a speedometer, the combination with a shaft adapted to be driven by the mechanism or vehicle the speed of which is to be measured, of a weight pivoted on said shaft and adapted to rotate therewith, a grooved wheel on said shaft and adapted to rotate therewith and to slide longitudinally thereupon, a link connecting said grooved wheel with said weight, a shaft bearing an index or pointer; and bearing a radially slotted disk, a pin operatively connected with said disk in the slot thereof and operatively connected with said grooved wheel, and means adapted to move said pin in said radial slot and to secure it therein at any desired point.

4. In a speedometer, the combination with a shaft adapted to be driven by the mechanism or vehicle the speed of which is to be measured, of a weight pivoted on said shaft and adapted to rotate therewith, a grooved wheel on said shaft and adapted to rotate therewith and to slide longitudinally thereupon, a link connecting said grooved wheel with said weight, a shaft bearing an index or pointer; and bearing a radially slotted disk, a pin operatively connected with said grooved wheel, and means adapted to move said pin in said radial slot and to secure it therein at any desired point, said means comprising a link and an eccentric cam journaled in said disk.

5. In a speedometer, the combination with a shaft adapted to be driven by the mechanism or vehicle the speed of which is to be measured, of a device movable longitudinally on said shaft, means for imparting movement to said device proportionately to the speed of the shaft, means operated by said longitudinally-movable device for indicating the extent of its longitudinal movement and thereby the speed at which said mechanism or vehicle is being operated, and means intermediate the said longitudinally-movable device and the said indicating means adapted to adjustably operatively connect the same together; said indicating means comprising a graduated dial and a shaft bearing an index or pointer; and said intermediate means comprising a slotted disk fast on said index shaft, a pin operatively connected with said disk in the slot thereof and also operatively connected with the said longitudinally-movable device on the driven shaft, and means adapted to move said pin in said slot toward or away from the index shaft.

6. In a speedometer, the combination with a shaft adapted to be driven by the mechanism or vehicle the speed of which is to be measured, of a device movable longitudinally on said shaft, means for imparting movement to said device proportionately to the speed of the shaft, means operated by said longitudinally-movable device for indicating the extent of its longitudinal movement and thereby the speed at which said mechanism or vehicle is being operated, and means intermediate the said longitudinally-movable device and the said indicating means adapted to adjustably operatively connect the same together; said indicating means comprising a graduated dial and a shaft bearing an index or pointer; and said intermediate means comprising a radially slotted disk on said index shaft, a pin operatively connected with said disk in the slot thereof and also operatively connected with the said longitudinally-movable device on the driven shaft, a link adapted to move said pin in said slot radially toward or away from the index shaft, and an eccentric cam for operating said link.

In witness whereof I have hereunto signed my name this first day of November 1907, in the presence of two subscribing witnesses.

JOSEPH W. JONES.

Witnesses:
THOS. S. BARRETT,
ARTHUR NICHOLS.